United States Patent [19]
Rose

[11] Patent Number: 5,382,277
[45] Date of Patent: Jan. 17, 1995

[54] PROCESS FOR REDUCING FINE-GRAIN IRON OXIDE MATERIALS WITH A GAS

[75] Inventor: Fritz Rose, Bad Homburg, Germany

[73] Assignee: Metallgesellschaft Aktiengesellschaft, Frankfurt am Main, Germany

[21] Appl. No.: 127,267

[22] Filed: Sep. 24, 1993

[30] Foreign Application Priority Data

Oct. 2, 1992 [DE] Germany ................. 4233140

[51] Int. Cl.[6] .................. C22B 5/14; C21B 13/14
[52] U.S. Cl. ................................ 75/450; 266/172
[58] Field of Search ........................ 75/450; 266/172

[56] References Cited
U.S. PATENT DOCUMENTS 5,082,251 1/1992 Whipp ..................... 266/172
5,185,032 2/1993 Whipp ..................... 266/172

*Primary Examiner*—Melvyn J. Andrews
*Attorney, Agent, or Firm*—Herbert Dubno; Jonathan Myers

[57] ABSTRACT

A process is described in which iron oxide-containing materials are reduced by a treatment with a gas under-pressure in series-connected fluidized bed reactors, wherein hydrocarbons are cracked to produce the fresh reducing gas, reducing gas is fed to the first fluidized bed reactor as a fluidizing gas, the gaseous effluent from the first fluidized bed reactor is dedusted and is then fed as a fluidizing gas to at least one further fluidized bed reactor is dedusted and is subsequently treated in a scrubber-cooler to remove substantially all $H_2O$ and residual dust, purified gas is recycled as recycle gas to the first fluidized bed reactor and the iron oxide-containing materials are preheated and are subsequently fed to the last fluidized bed reactor. The hydrocarbons are cracked by an approximately stoichiometric steam stoichiometric steam reforming. The freshly produced reducing gas is fed to one or more fluidized bed reactors.

11 Claims, 4 Drawing Sheets

PROCESS FOR REDUCING FINE-GRAIN IRON OXIDE MATERIALS WITH A GAS

FIELD OF THE INVENTION

The present invention relates to a process for reducing iron oxide-containing fine-grained materials by a treatment with a gas under pressure in series-connected fluidized bed reactors.

More particularly the invention relates to a method or process wherein hydrocarbons are cracked to produce a fresh reducing gas, reducing gas is fed to a first fluidized bed reactor (in terms of the gas flow) as a fluidizing gas, the gaseous effluent from the first fluidized bed rector is dedusted and is then fed as a fluidizing gas to at least one further fluidized bed reactor, the gaseous effluent from the last fluidized bed reactor is dedusted and is subsequently treated in a scrubber-cooler to remove substantially all $H_2O$ and residual dust, purified gas is recycled as recycle gas to the first fluidized bed reactor and the iron oxide-containing materials are preheated and are fed to the last fluidized bed reactor (in terms of the gas flow).

BACKGROUND OF THE INVENTION

Because gas is utilized only to a low degree in a fluidized bed reactor, the utilization of the gas usually must be improved by providing a plurality of fluidized bed reactors, namely, at least two and preferably three fluidized bed reactors, are connected in series. Alternatively a fluidized bed reactor can be used in which a plurality of fluidized beds are superposed and are traversed in succession as a result an improved utilization of the gas can be achieved in both cases in a counter-current operation.

The degree of utilization of the gas and the reducing rate is low at temperatures below about 600° C. The fluidized bed is destroyed at temperatures above about 750° C. because the reduced particles of iron ore then stick together so that they become too heavy for use in a fluidized bed. Besides, reduced particles of ore are preferentially sinter-bonded to metallic surfaces to form crusts, which more or less quickly restrict the flow through the fluidized bed reactor.

The reduction of iron ore is formally described by the following equation:

$$Fe_2O_3 + 3H_2 \rightarrow 2\,Fe + 3\,H_2O \qquad (1)$$

$$Fe_2O_3 + 3CO \rightarrow 2\,Fe + 3\,CO_2 \qquad (2)$$

Experience has shown that the degree of utilization of a gas in fluidized bed reactors is lower than in shaft furnaces, in which the transfer of mass and heat is optimized by the counter-current operation.

The freshly produced reducing gas (make-up gas) contains $CO_2$ and $H_2O$ as oxidizing components, particularly if it comes from a steam reformer.

In the FIOR process (*The 38th Electric Furnace Conference*, AIME, Dec. 9-12, 1980, Pittsburgh, Pa.), the gas coming from a steam reformer is initially fed to a CO shift converter and is then cooled to condense water and is passed through a scrubber to remove $CO_2$.

Only after this expensive after-treatment does the freshly produced reducing gas have a sufficiently high reducing strength. But the thus purified gas must be reheated to the reducing temperature before it is fed as a fluidizing gas to the first fluidizing bed reactor of a multistage fluidized bed reactor plant, which consists of a plurality of fluidized bed reactors connected in series.

OBJECTS OF THE INVENTION

It is an object of the invention to provide an improved process for reducing iron oxide-containing fine-grained materials with a freshly produced reducing gas, which without a preceding aftertreatment has a high reducing strength.

It is another object of the invention to provide for the reduction of iron oxide-containing materials an improved process or method which is effective, energy-saving and inexpensive.

SUMMARY OF THE INVENTION

These objects are attained in accordance with the invention, by cracking the hydrocarbons by an approximately stoichiometric steam reforming, reheating the recycle gas, feeding the reheated recycle gas as a fluidizing gas into the first fluidized bed reactor, feeding freshly produced reducing gas to one or more fluidized bed reactors, and treating the gaseous effluent from the last fluidized bed reactor in a scrubber-cooler to remove substantially all dust and $H_2O$. According to the invention, the latter gaseous effluent is subsequently treated in a $CO_2$ scrubber to remove substantially all $CO_2$ and is then recycled as the recycle gas.

A fluidizing gas is a gas which is introduced into the fluidized bed reactor below the nozzle bottom, which may comprise a grate or, if the bottom has no grate, may comprise venturis.

The reduction by the reducing gas is effected under a pressure of 5 to 30 bars, preferably 10 to 25 bars. Steam reforming is carried out at a temperature of 600° to 1000° and under a pressure up to 30 bars. The hydrocarbons which may be employed can include natural gas, liquefied gas (methane), propane and butane gas and refinery residual gas and preferably consist of high-methane gases. 1.1 to 1.5 moles $H_2O$ are used per mole of carbon in the approximately stoichiometric steam reforming.

Even under the most favorable conditions the gaseous effluents produced by the reduction can have high contents of the reducing gases $H_2$ and CO. After $CO_2$ has been scrubbed off, the gaseous effluent from the last fluidized bed reactor is purified to contain $\leq 1\%$ by volume $CO_2$. In dependence on the temperature and pressure during the cooling the $H_2O$ content is about $<5\%$ by volume. The gaseous effluent produced by that treatment has excellent reducing properties.

In that case the reduction coefficient $$R = \frac{CO + H_2}{CO_2 + H_2O}$$

of the gas is usually in greater than 10.

Owing to the equilibrium ratios, a reduction coefficient $R>10$ will be required for the reduction of fine-grained iron ores at temperatures above 600° C. The higher the value of R, the faster will the iron ore be reduced because the equilibrium of the reaction is shifted to the side of the reduced product.

A recycle gas which is free from dust is produced by removing the reaction products $H_2O$ and $CO_2$ from the exhaust gas of the reducing process. The recycle gas contains $<1\%$ by volume $CO_2$ and in dependence on the temperature and pressure during the cooling has a water content of <5% by volume. The reduction coefficient is usually greater than 10.

Particularly if it comes from a steam reformer, the freshly produced reducing gas (make-up gas) will contain much more oxidizing constituents $CO_2$ and $H_2O$ after the reforming $$CH_4 + x\, H_2O \rightarrow CO + 3\, H_2 + (x-1)\, H_2O$$

than a recycle gas after the removal of $H_2O$ and $CO_2$.

Even after an approximately stoichiometric steam reforming with, e.g. only 1.3 moles $H_2O$ per mole of $CH_4$, 0.3 mole of unreduced $H_2O$ will strictly theoretically remain and will decrease the reducing strength of the gas which is produced.

The advantages afforded by the invention reside in that a freshly produced reducing gas can be obtained much more simply than by known processes. Less steam is required for the approximately stoichiometric steam reforming. The gas can directly be fed to the above-mentioned reducing reactor plant without a previous removal of $CO_2$ and $H_2O$.

Because CO gas can be used in that process without a disadvantage, an expensive removal of CO by a shift conversion of CO to $CO_2$ and a subsequently scrubbing to remove $CO_2$ is not required. Because it is not necessary to remove CO or $CO_2$ gas from the freshly produced reducing gas, it is not necessary to cool the gas to the temperature that is required to scrub off $CO_2$ and subsequently to heat the gas to the reaction temperature required for the reduction of iron oxide-containing materials. As a result, a cooling stage and a heating stage are saved. A further advantage resides in the fact that less electrical energy is consumed (in displacing gas) because there is a lower pressure drop in the gas path between the gas producer and the reducing reactor.

According to a further feature the freshly produced reducing gas is produced by a gasification of oil or coal with oxygen and the reducing gas is produced under approximately stoichiometric conditions.

For that purpose, 0.8 to 1 mole of oxygen ($O_2$) is used per 2 moles of carbon (C) to prevent a formation of surplus $CO_2$, which would have a reduced activity.

The gasification of oil or coal with oxygen affords the advantage that hydrocarbons having longer chains, i.e., also liquid hydrocarbons, possibly in a mixture with solid hydrocarbons, may be used to produce the reducing gas. For this reason, plants which were originally equipped for the gasification of oil or coal may now be used in the process in accordance with the invention.

According to a further feature, the freshly produced reducing gas is added to the recycle gas before or during the heating of the recycle gas.

Because the temperature of the freshly produced reducing gas greatly exceeds the sticking temperature of the reducing iron ore, i.e., the reduction temperature, it is sufficient to heat the cold recycle gas to a moderately elevated temperature because the desired reduction temperature can be adjusted by mixing both gas streams. The rate of the recycle gas which is to be preheated is lower than that rate in processes comprising a conventional steam reforming at least by the rate at which the gas is freshly produced. This results in considerable savings of energy and at low capital cost.

The freshly produced reducing gas may be admixed to the recycle gas optionally before or during or after the heating of the recycle gas. The point at which the freshly produced reducing gas is admixed to the recycle gas will depend on the required temperature of the mixed reducing gas. Energy for heating the recycle gas will be saved if the freshly produced reduction gas is admixed to the cold recycle gas before or during the heating of the latter.

That measure is also adopted to prevent metal dusting. "Metal dusting" is a deposition of carbon, which is formally formed in accordance with the equation 2 $CO \rightarrow C + CO_2$. Carbon may form because the recycle gas has a high concentration of CO. The formation of carbon is suppressed by the admixing of a partial stream of the freshly produced reducing gas because the freshly produced reduction gas has much higher contents of $CO_2$ and $H_2O$.

According to a further feature mixed gases composed of freshly produced reducing gas and recycle gas are fed to the first fluidized bed reactor and the freshly produced reducing gas is cooled to the reduction temperature by being mixed with the recycle gas. The mixed gases are fed as a fluidizing gas to the first fluidized bed reactor.

Gas which has been produced by an approximately stoichiometric steam reforming and is at an elevated temperature, e.g. of or above 900° C., and has a reducing strength R of, e.g. 6, is mixed with the recycle gas which has left the last fluidized bed reactor and has been treated to remove substantially all $H_2O$ and $CO_2$ and is recycled as recycle gas to the multistage fluidized bed reactor plant. The reducing strength of that mixed gas is >10.

By the mixing of the gases, the freshly produced reducing gas is cooled to the required reduction temperature because the temperature of the freshly produced reducing gas greatly exceeds the sticking temperature (750° C.). The temperature required for the reduction in the fluidized bed is about 600° to 900° C., preferably about 760° to 820° C.

According to a further of the invention, a partial stream is branched from the gaseous effluent from a fluidized bed reactor and is fed to the next following fluidized bed reactor above nozzle bottom, thereby avoiding a clogging of the nozzle bottoms, as will be explained hereinafter.

According to a further feature of the invention, the recycle gas is fed as a fluidizing gas to the first fluidized bed reactor, the freshly produced reducing gas is fed as a fluidizing gas to the succeeding (next) fluidized bed reactor, and the gaseous effluent from a fluidized bed reactor is fed to the next following fluidized bed reactor and all of these gases are introduced above the respective nozzle bottoms.

The exhaust gas from the reducing reactor is not entirely free of dust, even if it has been passed through a dedusting cyclone. If a gas laden with reduced iron ore is conducted from one reactor into the next, deposits will be formed in the nozzle plates of the fluidized bed reactors and in the units and pipes connecting them and will adhere to form crusts, which will result in a constantly increasing pressure drop and finally render the fluidized bed reactor plant inoperative.

Whereas the gases may entirely be dedusted between succeeding reducing stages in that the gases can be cooled in a water scrubber and can be subsequently heated, this is usually so expensive that the process is no longer economical.

For this reason the dust-containing gases are laterally introduced into the fluidized bed reactors above the respective nozzle bottoms in the process in accordance with the invention. To introduce a gas into the fluidized bed reactor from below and to fluidize the material it is necessary, however, that at least one partial stream of the gas flows through the nozzle bottom from below. The rate of that dust free gas flowing through the nozzle bottom should be about 20 to 30% of the total rate at which gas is fed to a given reactor. A clogging of the nozzle bottoms of fluidized bed reactors can thereby be prevented in that a dustfree reducing gas at a lower rate is introduced into the fluidized bed reactor below the nozzle bottom and a dust-containing gas at a higher rate is laterally introduced into the fluidized bed reactor above the nozzle bottom.

Because the gas leaving the steam reformer is dustfree, it may directly be fed to the fluidized bed reactors if it has been produced under a suitable pressure and at a corresponding temperature. Because that freshly produced reducing gas (make-up gas) has a lower reducing strength than the purified recycle gas, the freshly produced reducing gas is fed to those reactors or reducing stages in which only a partial or preliminary reduction is to be effected. These reactors consist of the second and third fluidized bed reactors, and, if desired, any succeeding fluidized bed reactor. In that case the freshly produced reducing gas is used mainly for a preliminary reduction and the purified gaseous effluent which is recycled and has been suitably compressed and heated is mainly used for a final reduction. The dust-laden gaseous effluent formed by the final reduction is introduced into the fluidized bed above the nozzle bottom and the freshly produced, dustfree reducing gas is introduced from below through the nozzle plate.

According to a further feature of the invention, a partial stream of the recycle gas is admixed to the freshly produced reducing gas.

In addition to the fact that a clogging of the nozzle plate is avoided, a further advantage afforded by the invention resides in that the temperature of the freshly produced hot gases can be adjusted in dependence on the temperature required for the preliminary reduction by an admixing of cold or only moderately preheated recycle gas with the freshly produced gas. That admixing will also improve the quality of the freshly produced reducing gas (make-up gas) so that the mixed gases will have a higher reducing strength than the freshly produced reducing gas. A special advantage resulting from the routing of the gases in accordance with the invention resides in that the heater for the recycle gas is smaller and less expensive because a lower rate of recycle gas is to be heated.

In yet another feature of the invention, respective partial streams of the recycle gas are admixed in the second and the following fluidized bed reactors with the freshly produced reducing gas below the respective nozzle bottoms. In the second and any following fluidized bed reactor the gases are mixed below the nozzle bottom. The mixed gases flow as a fluidizing gas through the nozzle bottom and thus flow into the reactor from below and fluidize the material.

According to still another feature of the invention, a partial stream of the recycle gas is branched off before or during the heating of the recycle gas.

The branching of a partial stream from the stream of recycle gas before or during the heating thereof permits an exact control of the temperature and of the volume ratio of the freshly produced reducing gas to the recycling gases and thus permits an exact adjustment of the reduction coefficients of the fluidizing gas in the second and following fluidized bed reactors, in which a partial or preliminary reduction is effected. In the second fluidized bed reactor the freshly produced reducing gas is preferably mixed with a partial stream of reducing gas which has been branched from the recycle gas before it is heated. The freshly produced reducing gas is at a high temperature and is cooled to the required reduction temperature by a controlled admixing of cold recycle gas.

The freshly produced reduction gas in the third fluidized bed reactor has a lower temperature as in the second fluidized bed reactor and is preferably admixed with a part stream of the recycle gas which is branched off the recycle gas during the heating of the same so that a mixed gas with the required reduction temperature results by controlled mixing. The branching of part streams of the recycle gas before or during the heating of the same results in decreasing of the amount of the branched part streams. The gas heater for the heating of the remaining recycle gas can then be smaller and highly economical.

As will be explained further with reference to the examples, reducing gas will be consumed at different rates in the several fluidized bed reactors of a fluidized bed reactor plant. For this reason the controlled admixing of the freshly produced reducing gas with the recycle gas in each fluidized bed reactor permits, as has been explained hereinbefore, not only an adjustment of the temperature desired in each case but also an adjustment of the mixing ratio desired in each case of the freshly produced reducing gas to the recycle gas if reducing gas at different rates is consumed in the several fluidized bed reactors.

Preferably at least one fluidized bed reactor is included in a circulating fluidized bed system.

The orthodox "fluidized bed" is distinguished by a dense phase separated by a distinct density step from the overlying gas space. A circulating fluidized bed system, on the other hand, consists of the fluidized bed reactor, the recycle cyclone, and the recycle line. In the fluidized bed reactor of an expanded fluidized bed system there are states of distribution without a defined boundary layer. There is no density step between a dense phase and an overlying dust or gas space but in the reactor the solids concentration decreases continuously from bottom to top. A gas-solids suspension is discharged from the upper portion of the reactor. The definition of the operating conditions by the Froude and Archimedes numbers results in the operating ranges $$0.1 \leq 3/4 \times Fr^2 \times \frac{\rho_g}{\rho_k - \rho_g} \leq 10$$

and $$0.01 \leq Ar \leq 100,$$

wherein $$Ar = \frac{d_k^3 \times g(\rho_k - \rho_g)}{\rho_g \times v^2}$$

and $$Fr^2 = \frac{u^2}{g \times d_k}$$

and
u=relative gas velocity in m/sec.

Ar = Archimedes number
Fr = Froude number
$\rho_g$ = density of gas in kg/m³
$\rho_k$ = density of solid particle in kg/m³
$d_k$ = diameter of spherical particle in m
$\nu$ = kinematic viscosity in m²/sec
g = constant of gravitation in m/sec²

The suspension discharged from the fluidized bed reactor is fed to the recycle cyclone of the circulating fluidized bed system and in that cyclone is treated to remove substantially all solids, and the collected solids are recycled to the fluidized bed reactor in such manner that the circulation rate of solids in the circulating fluidized bed system is at least four times the weight of solids contained in the fluidized bed reactor.

The advantage afforded by a circulating fluidized bed system resides in the still further improved transfer of mass and heat between the reducing gas and the materials which contain iron oxide because a circulating fluidized bed is much more expanded so that the utilization of the gas is improved. The risk of sticking is also decreased by the circulating fluidized bed system.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
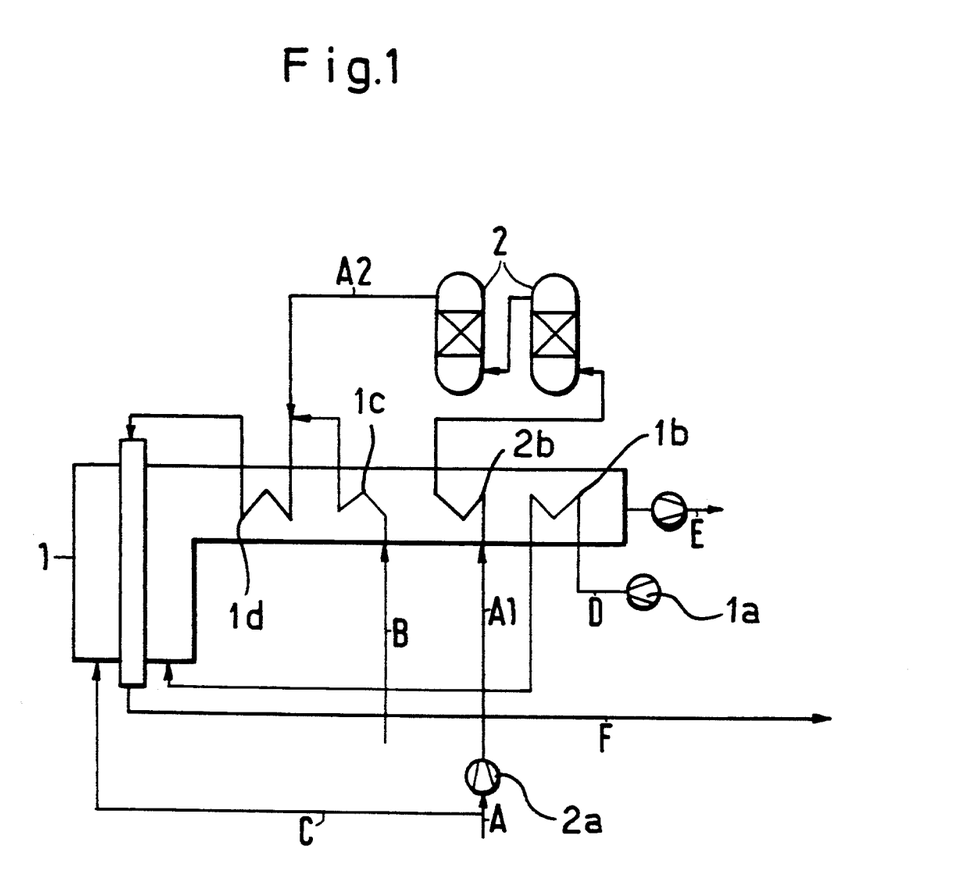
FIG. 1 is a flow diagram of the plant for the steam reforming (gas reformer)

The steam reforming of the gaseous hydrocarbon, preferably methane, is effected by means of the plant shown in FIG. 1. The plant consists of a gas reformer 1 provided with a heat exchanger and a desulfurizer 2. A partial stream is initially branched via line C from the gaseous hydrocarbon supply A and is fed to the gas reformer to heat the same by combustion. Through line D, the combustion air is displaced via blower 1a first through the heat exchanger 1b and thereafter into the gas reformer. The hydrocarbon which has been branched off through line C and fed to the gas reformer and the air are combusted and are discharged as exhaust gases through line E.

The gaseous hydrocarbon fed via line A1 and a blower 2a is heated in the heat exchanger 2b and fed to the desulfurizer 2.

The desulfurized hydrocarbon effluent is mixed in line A2 with steam, which before it is admixed is conducted in line B through the heat exchanger 1c. The mixed gases consisting of the gaseous hydrocarbon and water vapor are conducted through the heat exchanger 1d and heated therein and are fed through line A2 to the gas reformer 1, in which reforming is effected. The freshly produced reducing gas is fed in line F to the multistage fluidized bed reducing plant of FIGS. 2, 3 or 4.

The design of the multistage fluidized bed reducing plant shown in FIG. 2 will subsequently be explained.

The freshly produced reducing gas is fed in line F to the gas mixer 3. Before the freshly produced reducing gas is fed to the gas mixer 3, a partial stream of this gas can be branched off line F1 and admixed with the recycle gas during or before the heating thereof. In the gas mixer 3 the freshly produced reducing gas is mixed with the recycle gas, which has been preheated in the gas heater 20 and is fed to the gas mixer over line K3.

The mixed gases from the gas mixer 3 are fed in line G1 as a fluidizing gas into the first fluidizing bed reactor 4. The fluidizing bed reactor 4 is the first reactor on the side of the gas. Dust-containing gas from the fluidized bed reactor 4 is fed to the cyclone 5a, in which substantially all dust is removed from the gaseous effluent and the solids settle in the lower portion of the cyclone 5a. The gaseous effluent from the cyclone 5a is conducted in line G2 and introduced as a fluidizing gas into the second fluidized bed reactor 6 below the nozzle bottom.

The gaseous effluent from the fluidized bed reactor 6 is fed to the cyclone 7a, in which the solids settle in the lower region. The gaseous effluent form the cyclone 7a is substantially dustfree and is conducted in line G3 and introduced as fluidizing gas into the fluidizing bed reactor 8 below its nozzle bottom.

The gaseous effluent from the fluidized bed reactor 8 (last, with respect to gas flow) is fed to the cyclone 9a, in the lower region of which most of the solids settle. The substantially dustfree gaseous effluent is fed in line G4 to the cyclone 10.

Line G4 is connected to line S, through which oxygen can be supplied. Thus a partial combustion can be effected in line G4 if the temperature of the gaseous effluent from the cyclone 9a is not sufficient to preheat the ore as required.

The cyclones 10, 11, 12, and the suspension heat exchanger 13 are multistage preheating means. The gaseous effluent from the cyclone 10 is fed in line G5 into the cyclone 11 and the gaseous effluent from the cyclone 11 is fed in line G6 into the cyclone 12 and from the latter through line G7 to the suspension heat exchanger 13. The gaseous effluent from the suspension heat exchanger 13 is fed in line G8 to the waste-heat boiler 14 and is cooled therein.

The gaseous effluent is then fed in line G9 into the scrubber-cooler 17, in which water and dust are removed from the gaseous effluent. The gaseous effluent from the scrubber-cooler 17 is fed in line G10 into the CO$_2$-removing scrubber 18, in which the CO$_2$ is removed form the gas and from which spent liquor is withdrawn, which is fed in line G11 to a liquor regenerator 15 in a heat cycle with the waste heat boiler 14.

Regenerated scrubbing liquor from the liquor regenerator 15 is recycled by the liquor pump 16 in line G12 to the CO$_2$-removing scrubber 18. In the liquor regenerator 15 the liquor withdrawn from the CO$_2$-removing scrubber 18 is heated to remove CO$_2$ from the liquor, which is thus unladen. A cooler, not shown in the drawing, is provided between the liquor regenerator 15 and the liquor pump 16. The liquor regenerator 15 effects a heating to about 105° to 115° C. The regenerated liquor is cooled in the cooler to the temperature of about 40° to 50° C. which prevails in the CO$_2$-removing scrubber 18.

The illustrated circuit comprising the CO$_2$-removing scrubber 18, liquor regenerator 15, liquor pump 16 and lines G11 and G12 exemplifies in a simplified manner how the liquor can be treated after a CO$_2$-removing scrubber. The $CO_2$-removing scrubber 18 is laden with the $CO_2$ gas which is contained in the gaseous effluent that is introduced via line G10 into the $CO_2$-removing scrubber 18. That $CO_2$ which has been introduced must continuously be removed from the $CO_2$-removing scrubber 18 and this is effected as explained by means of the circuit described hereinbefore.

A gas from which $CO_2$ has been removed leaves the $CO_2$-removing scrubber 18 and is recycled via line K1 to a recycle compressor 19 and from the latter in line K2 as recycle gas to the multistage fluidized bed reducing plant. The recycle gas from the recycle compressor 19 is initially fed in line K2 to the gas heater 20. The heated recycle gas is fed from the gas heater 20 in line K3 to the gas mixer 3.

A dustfree purge stream is branched in line G10 from the gaseous effluent coming from the scrubber-cooler 17 and is fed in line L to the heat exchanger 20a of the gas heater 20. That purge stream is branched off in order to reduce the concentration of $N_2$ in the gaseous effluent and to heat the gas heater 20. Air which has been heated in the heat exchanger of the gas heater 20 is fed in line M to the heat exchanger of the gas heater 20 and is combusted with the purge stream fed in line L. The exhaust gases from the gas heater 20 are discharged through line P.

The cyclones 5b, 7b and 9b may additionally be connected as second cyclones to the fluidized bed reactors 4, 6 and 8 if the effect of any cyclone, namely, the cyclones 5a, 7a, and 9a, is not sufficient for a dedusting of the gas to the required degree.

The materials which contain iron oxide are fed to the cyclone 12 by means of an iron oxide feeder, which consists of a belt conveyor 21, a storage bin 22 for oxide, two charging vessels 23a and 23b, and a metering unit 24. The materials which contain iron oxide are fed by the belt conveyor 21 to the storage bin 22 for oxide. The charging vessels 23a and 23b are charged in alternation with iron oxide-containing materials from the storage bin 22 for oxide. During the charging of one of the charging vessels 23a and 23b, the connection between the charging vessel 23a or 23b then to be charged and the metering unit 24 is interrupted. When the charging vessel 23a or 23b has been charged, it is closed and pressurized. As soon as the second charging vessel 23a or 23b is empty, the connection between the empty charging vessel and the metering unit 24 is interrupted and the connection between the previously filled charging vessel 23a or 23b and the metering unit 24 is established. As the charging vessel 23a or 23b is discharged, the empty charging vessel 23a or 23b is charged as previously described. The charging of the charging vessels 23a and 23b in alternation is repeated as often as desired.

The materials which contain iron oxide are fed from the metering unit 24 through line Z1 to the cyclone 12. From the cyclone 12 the materials which contain iron oxide pass through the multistage preheater consisting of the cyclones 10, 11 and 12 and the suspension heat exchanger 13. Preheated gaseous effluent from the cyclone 11 is supplied through line G6 to the cyclone 12. The materials which contain iron oxide are fed from the cyclone 12 to the suspension hat exchanger 13 and from the latter to the line G4 between the cyclones 9a and 10.

The heavy particles which contain iron oxide fall into the cyclone 9a. The iron oxide-containing lighter parts are entrained by the gaseous effluent from the cyclone 9a in line G4 to the cyclone 10 and from the cyclone 10 to the cyclone 11.

From the cyclone 11 a part of the materials which contain iron oxide is fed directly to the fluidized bed reactor 8 or by the gaseous effluent from the cyclone 10 is entrained to the cyclone 12 and further to the multistage preheating circuit explained hereinbefore, which comprises the cyclones 10, 11, and 12 and the suspension heat exchanger 13.

The solids are conducted from the cyclone 9a through the recycle line I1 to the last fluidized bed reactor 8 on the side of the gas and are introduced into the latter above the nozzle bottom. Solids from the fluidized bed reactor 8 are conducted via the dip tube T1 to the fluidized bed reactor 6. From the cyclone 7a solids are also fed in recycle line I2 to the fluidized bed reactor 6 and are laterally introduced into the latter above the nozzle bottom and are thus recycled to the fluidized bed reactor 6.

From the fluidized bed reactor 6 solids are fed via the dip pipe T2 to the first fluidized bed reactor 4 on the side of the gas. From the cyclone 5a, solids are recycled in part via the recycle line T3 to the first fluidized bed reactor and are laterally introduced into the latter above the nozzle bottom and a major part of the solids from the cyclone 5a are fed as reduced iron through line I4 to the product bin 25. Reduced iron from the fluidized bed reactor 4 is fed through the dip pipe T3 to the product bin 25.

Figure 2:
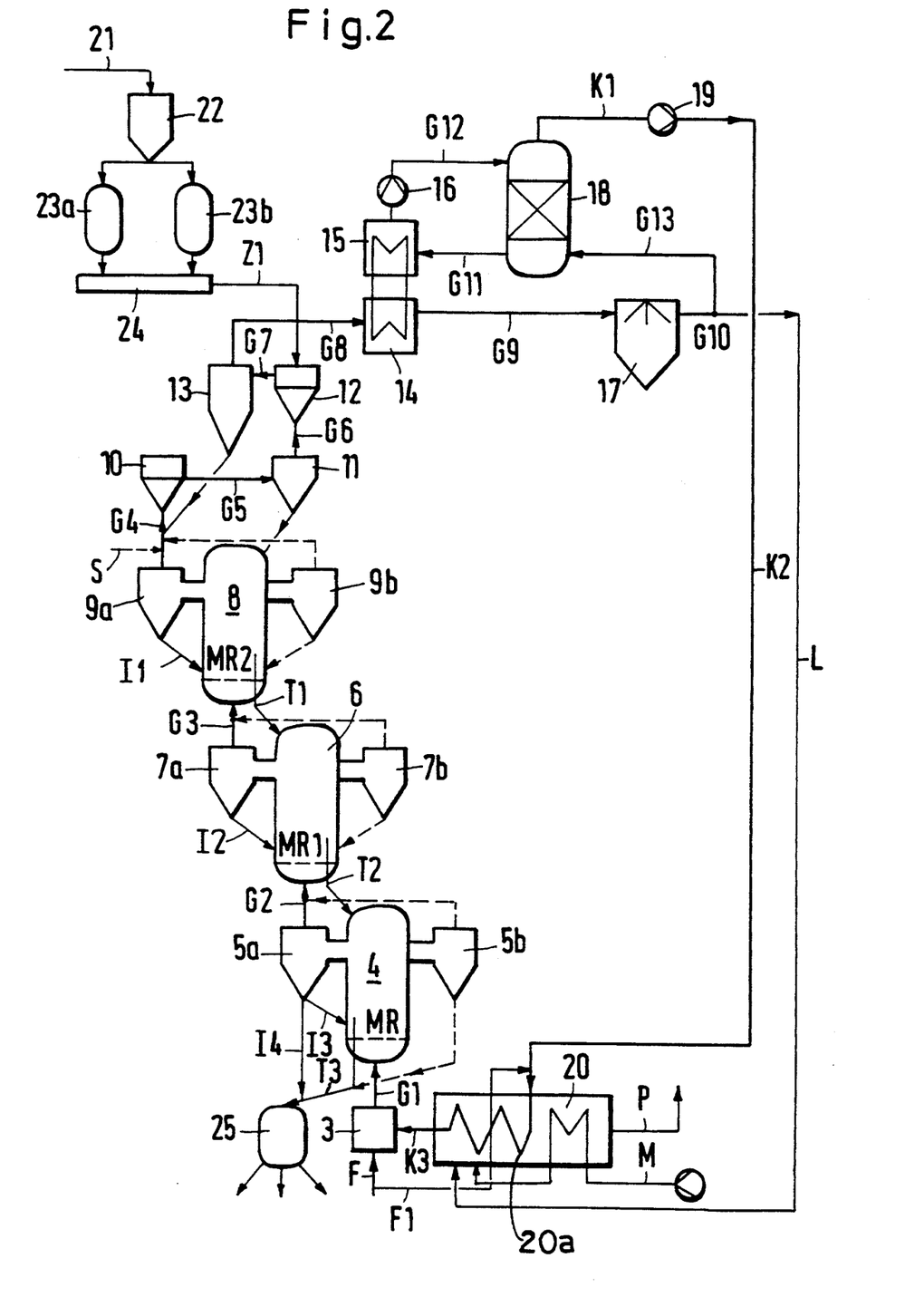
FIG. 2 is a flow diagram which shows a multistage fluidized bed reactor plant according to a first embodiment of the invention.
Figure 3:
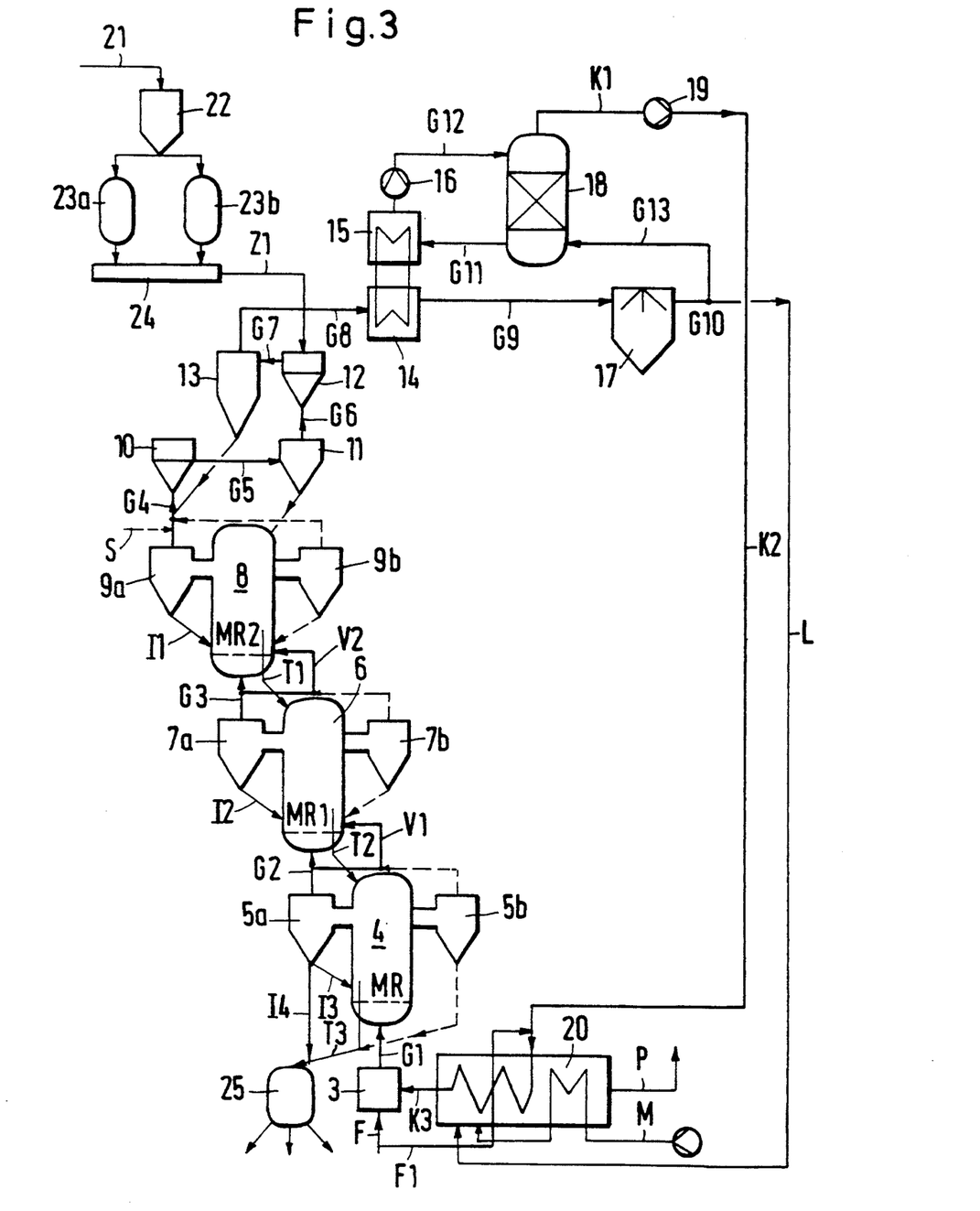
FIG. 3 is a flow diagram which shows a multistage fluidized bed reactor plant according to a second embodiment of the invention.

The multistage fluidized bed reducing plant shown in FIG. 3 differs from the multistage fluidized bed reducing plant of FIG. 2 in that the lines G2 and G3 between the cyclone 5a and the fluidized bed reactor 6 and between the cyclone 7a and the fluidized bed reactor 8 comprise a branching. A partial stream of the gaseous effluent in each of lines G2 and G3 is withdrawn and is fed in lines V1 and V2, respectively, to the fluidized bed reactors 6 and 8, respectively, and is introduced into the same above the nozzle bottom.

Figure 4:
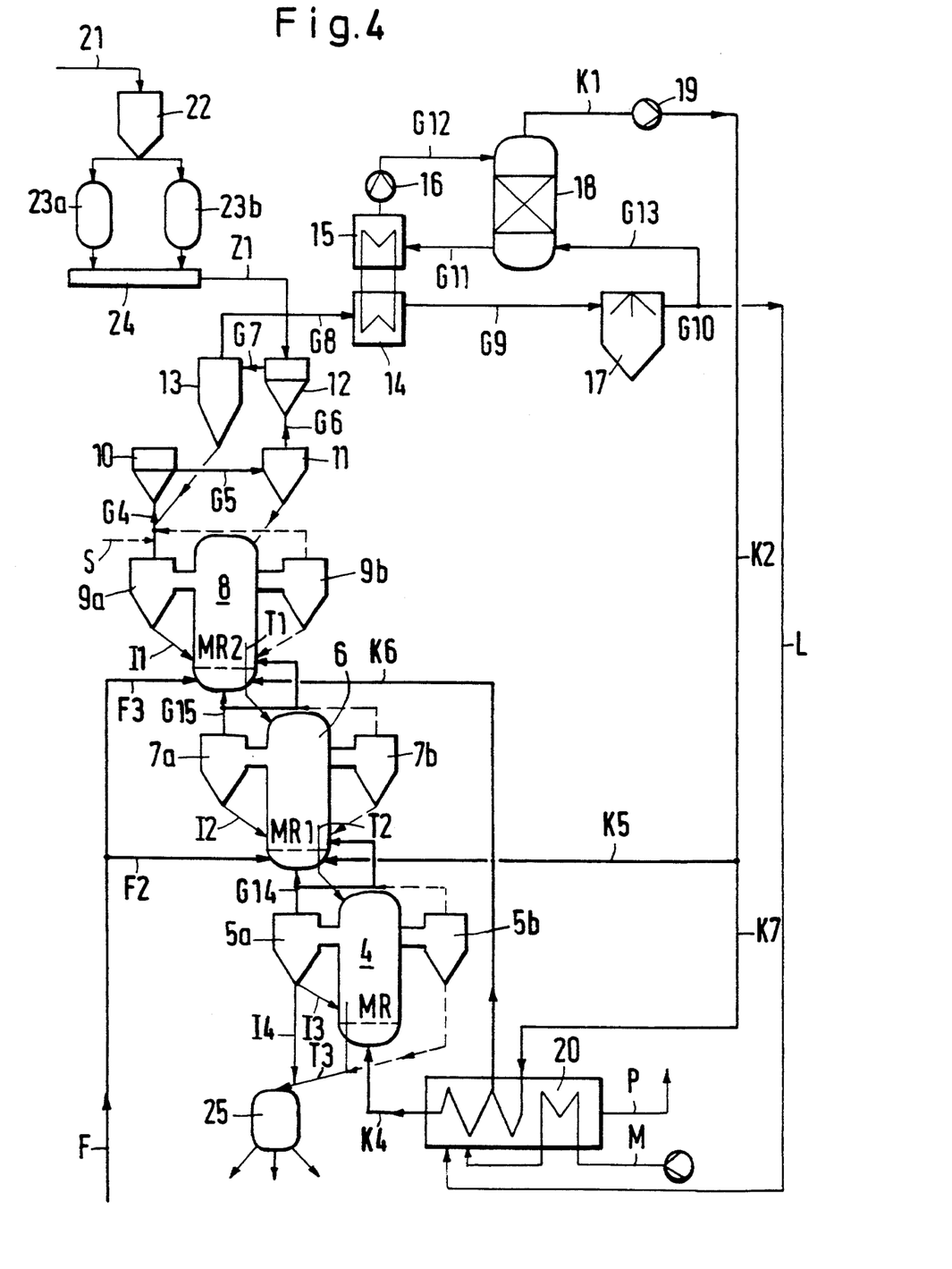
FIG. 4 is a flow diagram of a multistage fluidized bed reactor plant according to a third embodiment of the invention.

The multistage fluidized bed reducing plant shown in FIG. 4 differs from the multistage fluidized bed plant of FIG. 2 as will be explained hereinafter.

Only recycle gas is introduced as fluidizing gas into the first fluidized bed reactor 4 on the side of the gas from line K4 below the nozzle bottom.

A partial stream of freshly produced reducing gas which is conducted in line F2 as well as a partial stream which has been withdrawn from the recycle gas before it has been heated and is conducted in line K5 are introduced into the second fluidized bed reactor 6 below the nozzle bottom.

The gases are mixed below the nozzle bottom and flow as a fluidizing gas through the nozzle bottom MR1.

The gaseous effluent from the first fluidized bed reactor 4 is fed through the cyclone 5a in line G14 to the second fluidized bed reactor 6 and is laterally introduced into the latter above the nozzle bottom.

The third fluidized bed reactor 8 is supplied below the nozzle bottom with a partial stream conducted in line F3 and consisting of freshly produced reducing gas and with a partial stream consisting of preheated recycle gas and conducted in line K6. The gases are mixed below the nozzle bottom and flow as fluidizing gas through the nozzle bottom MR2. The gaseous effluent from the second fluidized bed reactor 6 is conducted from the cyclone 7a in line G15 to the third fluidized bed reactor 8 and is laterally introduced into the latter above the nozzle bottom. The rate of flow of the dust-free mixed gases passing through the nozzle bottoms and consisting of the freshly produced reducing gas and the recycle gas should be about 20 to 30% of the total rate of flow of the gases consumed in the fluidized bed reactors.

For this reason a clogging of the nozzle plates can be avoided in that a smaller part of the dustfree reducing gas is introduced into the reactors below the nozzle bottoms and a larger part is laterally introduced as a dust-laden gas into the reactors above the nozzle bottoms.

Owing to the high reducing strength of the recycle gas used as a reducing gas in the first fluidized bed reactor 4 the latter is used for the final reduction of the iron ore. Because the freshly produced reducing gas from the steam reformer is dustfree, it can be directly introduced into the fluidized bed reactors below the nozzle bottom provided that that gas has been produced under an appropriate pressure and at an appropriate temperature. Because that freshly produced reducing gas or "make-up gas" has a lower reducing strength than the purified recycle gas, the "make-up gas" may be supplied to those reactors or reducing stages in which only a partial reduction or the preliminary reduction is desired.

According to a further feature the partial to complete heating of the materials which contain iron oxide is effected by an independent heat source.

The partial to complete heating of the materials which contain iron oxide can be effected by a direct heating in the storage bin 22 for oxide or in the charging vessels 23a and 23b or even before the charging of the storage bin 22 for oxide.

The nozzle bottoms of the fluidized bed reactors of the described fluidized bed reducing plants comprise a grate. According to a further feature the grate of each fluidized bed reactor comprises venturi nozzles, or the nozzle bottoms of the fluidized bed reactors are designed as venturis.

The invention will be further explained with reference to the following Examples 1 and 2.

EXAMPLE 1

The production of the freshly produced reducing gas in the steam reformer and the mode of operation of the multistage fluidized bed reducing plant of FIG. 2 will be explained. The quantities of the starting materials and of the products will be stated and their compositions will be stated in percent by weight. The volumes per unit of time and the temperatures of the gases used in the multistage reducing process in fluidized bed reactors will be stated and their compositions in percent by volume will be compiled in tables.

102,820 kg (dry) ore at a temperature of 20° C. are used as iron oxide-containing materials to be reduced in accordance with the invention. The ore has the following composition in percent by weight:

| Fe (total) | 65.14 |
| gangue | 1.21 |
| water of crystallization | 5.29 |
| P | 0.11. |

The metallized product DRI (direct reduced iron) amounts to 69,426 kg. The metallized product has the following composition in percent by weight:

| Fe (metallic) | 68.23 |
| $Fe_3C$ | 20.18 |
| FeO | 8.51 |
| gangue | 1.91 |
| $Fe_3P$ | 1.02 |
| C | 0.15 |

TABLE I

GASES

| Line | Description | V(sm³/h) | T(°C.) |
|---|---|---|---|
| A | natural gas, total | 19 870 | 20 |
| A1 | natural gas to reformer | 13 493 | 20 |
| A2 | natural gas, desulfurized and preheated | 13 493 | 380 |
| B | steam | 19 116 | 400 |
| F | reforming gas | 60 000 | 900 |
| G1 | reducing gas | 180 000 | 780 |
| G2 | reducing gas | 175 814 | 805 |
| G3 | reducing gas | 176 438 | 759 |
| G8 | reducing gas | 176 560 | 720 |
| G10 | exhaust gas, cold | 139 360 | 40 |
| L | purge gas | 9 375 | 40 |
| G13 | recycle gas to $CO_2$-removing scrubber | 129 985 | 40 |
| K1 | recycle gas behind $CO_2$-removing scrubber | 120 000 | 40 |
| K2 | recycle gas behind compressor | 120 000 | 70 |
| K3 | recycle gas behind gas heater | 120 000 | 730 |

TABLE II

GAS COMPOSITIONS

| Volume % By Volume | Lines | | | | | |
|---|---|---|---|---|---|---|
| | A,A1,A2 | F | G1 | G8 | G10,L,G13 | K1,K2,K3 |
| $CH_4$ | 81.4 | 3.7 | 18.2 | 18.5 | 23.5 | 25.4 |
| $C_2H_6$ | 4.9 | — | — | — | — | — |
| +$C_2$-hydrocarbon | 4.5 | — | — | — | — | — |
| $H_2$ | — | 61.7 | 60.2 | 43.3 | 54.8 | 59.4 |
| CO | — | 21.1 | 16 | 9.8 | 12.4 | 13.5 |
| $CO_2$ | 9.2 | 2.8 | 1.6 | 6.8 | 8.6 | 1.0 |
| $H_2O$ | — | 10.7 | 4.0 | 21.6 | 0.7 | 0.7 |
| $N_2$ | — | — | — | — | — | — |
| Total | 100.0 | 100.0 | 100.0 | 100.0 | 100.0 | 100.0 |
| Reducing Strength R | — | 6.1 | 13.6 | 1.9 | 7.2 | 42.9 |

EXAMPLE 2

The mode of operation of the multistage fluidized bed reducing plant shown in FIG. 4 will be explained.

The quantities of the starting materials and of the products will be stated and their compositions will be stated in percent by volume. The volumes per unit of time and the temperatures of the gases used in the multistage reducing process illustrated in FIG. 4 will be stated and their compositions in percent by volume will be compiled in tables.

102,820 kg (dry) ore at a temperature of 20° C. are used as iron oxide-containing materials to be reduced in accordance with the invention. The ore has the following composition in percent by weight:

| | |
|---|---|
| Fe (total) | 65.14 |
| gangue | 1.21 |
| water of crystallization | 5.29 |
| P | 0.11. |

The metallized product DRI (direct reduced iron) amounts to 69,426 kg. The metallized products has the following composition in percent by weight:

| | |
|---|---|
| Fe (metallic) | 68.23 |
| $Fe_3C$ | 20.18 |
| FeO | 8.51 |
| gangue | 1.91 |
| $Fe_3P$ | 1.02 |
| C | 0.15 |

TABLE III

GASES

| Line | Description | V(sm³/h) | T(°C.) |
|---|---|---|---|
| F | freshly produced reducing gas | 60 000 | 900 |
| K4 | reducing gas to 4 | 156 000 | 780 |
| G14 | gas from 4 via 5a | 153 390 | 775 |
| K5 | recycle gas to 6 | 5 077 | 46 |
| F2 | freshly produced reducing gas to 6 | 29 923 | 900 |
| MR1* | fluidizing gas in 6 | 188 390 | 776 |
| G15 | gas from 6 via 7a | 188 812 | 742 |
| F3 | freshly produced reducing gas to 8 | 30 977 | 900 |
| K6 | recycle gas to 8 | 18 923 | 420 |
| MR2** | fluidizing gas in 8 | 237 812 | 736 |
| G8 | reducing process exhaust gas from 8 | 237 290 | 728 |
| G9 | recycle gas to scrubber-cooler | 237 290 | 250 |
| G10 | exhaust gas, cold | 199 569 | 40 |
| L | purge gas | 9 360 | 40 |
| G13 | recycle gas to $CO_2$-removing scrubber | 190 209 | 40 |
| K1 | recycle gas after $CO_2$-removing scrubber | 180 000 | 40 |
| K2 | recycle gas after compressor | 180 000 | about 70 |
| K7 | recycle gas to gas heater | 174 923 | about 70 |

*nozzle bottom in 6
**nozzle bottom in 8

TABLE IV

GAS COMPOSITIONS

| | Lines | | | | | |
|---|---|---|---|---|---|---|
| Volumes % by volume | F, F2 F3 | K4, K5, K6, K1, K2, K7 | G8 | G9, L, G13 | MR1* | MR2** |
| $CH_4$ | 3.7 | 25.4 | 20.2 | 24.0 | 22.3 | 20.4 |
| $H_2$ | 61.7 | 53.6 | 42.7 | 50.7 | 50.3 | 47.7 |
| CO | 21.1 | 12.9 | 10.3 | 12.2 | 13.2 | 12.2 |
| $CO_2$ | 2.8 | 1.0 | 5.3 | 6.3 | 1.8 | 3.5 |
| $H_2O$ | 10.7 | 0.7 | 16.4 | 0.7 | 6.9 | 11.4 |
| $N_2$ | — | 6.4 | 5.1 | 6.1 | 5.5 | 4.8 |
| Total | 100.0 | 100.0 | 100.0 | 100.0 | 100.0 | 100.0 |
| Reducing Strength R | 6.1 | 39.1 | 2.4 | 9.0 | 7.3 | 4.0 |

*nozzle bottom in 6
**nozzle bottom in 8

I claim:

1. A process of reducing fine grained iron oxide containing materials by a treatment with a gas under pressure in a series of connected fluidized bed reactors which includes at least a first fluidized bed reactor into which a reducing gas is fed and a last fluidized bed reactor downstream of the first fluidized bed reactor in the direction of the gas flow into which the fine grained iron oxide-containing materials are fed, comprising the steps of:

(a) cracking hydrocarbons by approximately stoichiometric steam reforming to produce a fresh reducing gas containing CO and $H_2$;

(b) feeding a reducing gas to a first of said fluidized bed reactors as a fluidizing gas to obtain a gaseous effluent containing dust;

(c) dedusting the gaseous effluent containing dust from said first fluidized bed reactor and then feeding the dedusted gaseous effluent as a fluidizing gas to at least one further fluidized bed reactor above the nozzle bottom thereof, in said series downstream of the first fluidized bed to obtain a gaseous effluent containing dust $CO_2$ and $H_2O$;

(d) dedusting a gaseous effluent containing dust, $CO_2$, and $H_2O$ from a last of said series of connected fluidized bed reactors in said series downstream of the first and any other fluidized beds and subsequently treating said dedusted gaseous effluent containing $CO_2$ and $H_2O$ from said last reactor in a scrubber-cooler to remove substantially all $H_2O$ and any residual dust and subsequently treating said gaseous effluent with all $H_2O$ substantially removed in a $CO_2$-removing scrubber to remove substantially all $CO_2$;

(e) reheating said gas wherein residual dust and substantially all $H_2O$ and $CO_2$ are removed and recycling the reheated gas as a recycle gas and feeding said recycle gas as fluidizing gas according to step (b) into the first of said fluidized bed reactors;

(f) preheating the iron oxide-containing materials and feeding preheated iron oxide-containing materials to the last of said fluidized bed reactors; and (g) feeding the fresh reducing gas produced in step (a) to at least one of said fluidized bed reactors.

2. The process defined in claim 1 wherein the fresh reducing gas in step (a) is produced by a gasification of oil or coal with oxygen and the reducing gas is produced under approximately stoichiometric conditions and is fed to at least one of said fluidized bed reactors.

3. The process defined in claim 1 wherein the fresh reducing gas is added to the recycle gas before or during the heating of the recycle gas.

4. The process defined in claim 1 wherein mixed gases composed of said fresh reducing gas and recycle gas are fed to the first fluidized bed reactor and the fresh reducing gas is cooled to a reduction temperature by being mixed with the recycle gas.

5. The process defined in claim 1 wherein a partial stream is branched from the gaseous effluent from at least one of said fluidized bed reactors and is fed to a next following fluidized bed reactor in said series downstream of said fluidized bed reactors above a nozzle bottom thereof.

6. The process defined in claim 1 wherein the recycle gas is fed as a fluidizing gas to the first of said fluidized bed reactors, the fresh reducing gas is fed as a fluidizing gas to a succeeding fluidized bed reactor in said series downstream of the first fluidized bed reactor, and the gaseous effluent from a fluidized bed reactor is fed to a next following fluidized bed reactor in said series downstream of said fluidized bed reactor, and all said gases are introduced above the respective nozzle bottoms.

7. The process defined in claim 6 wherein a partial stream of the recycle gas is admixed with the fresh reducing gas.

8. The process according to claim 6 wherein respective partial streams of the recycle gas are admixed in the second and each following fluidized bed reactors in said series downstream of the second fluidized bed reactor with the freshly produced reducing gas below the respective nozzle bottom.

9. The process defined in claim 6 wherein a partial stream of the recycle gas is branched off before or during the heating of the recycle gas.

10. The process defined in claim 1 wherein at least one of said fluidized bed reactors is included in a circulating fluidized bed system.

11. The process defined in claim 1 wherein a partial to complete heating of the iron oxide-containing materials is effected by direct heating in a storage or charging vessel or even before charging.

* * * * *